United States Patent [19]

Shirasu et al.

[11] 4,039,758
[45] Aug. 2, 1977

[54] LINE IDENTIFYING SYSTEM OF COMMON CONTROL TYPE AUTOMATIC EXCHANGE

[75] Inventors: Hirotoshi Shirasu; Hirotaka Usuda, both of Yokohama, Japan

[73] Assignee: Hitachi, Ltd., Japan

[21] Appl. No.: 670,904

[22] Filed: Mar. 26, 1976

Related U.S. Application Data

[63] Continuation of Ser. No. 471,600, May 20, 1974, abandoned.

[30] Foreign Application Priority Data

May 22, 1973 Japan .................................. 48-56269

[51] Int. Cl.² ............................................... H04Q 3/72
[52] U.S. Cl. ............................................... 179/18 FH
[58] Field of Search ............... 179/18 FH, 18 D, 18 E

[56] References Cited

U.S. PATENT DOCUMENTS

| | | | |
|---|---|---|---|
| 3,487,172 | 12/1969 | De'Raedt et al. | 179/18 FH |
| 3,746,797 | 7/1973 | Meise, Jr. et al. | 179/18 D |

*Primary Examiner*—Thomas W. Brown
*Attorney, Agent, or Firm*—Craig & Antonelli

[57] ABSTRACT

A line identifying system for an automatic switching system of the common control type employs a line identifier adapted to be connected to any of a plurality of switch frames through a connector, which cuts off the operating circuit for a connector relay corresponding to a switch frame upon receipt of instructions from the line identifier and prepares the operating circuit of the connector relay corresponding to the switch frame upon receipt of instructions from a switch controller.

8 Claims, 3 Drawing Figures

LINE IDENTIFYING SYSTEM OF COMMON CONTROL TYPE AUTOMATIC EXCHANGE

This is a continuation of application Ser. No. 471,600, filed May 20, 1974, now abandoned.

The present invention relates to a system for identifying a calling line in an automatic switching system of the common control type.

In an automatic switching system of the common control type, each line is connected to one of the terminals of a switch network comprising one or more switch frames. The switch control device is required to known the terminal position on the switch frame of a subscriber to be connected, that is, a calling subscriber or a called subscriber. It is well known that the identification of the calling line is effected by a calling line identifying circuit for detecting and identifying a change in status of the line circuit due to the off hook condition of the telephone handset of the calling subscriber. It is also well known that the whole or part of the calling line identifying circuit is incorporated within the switch control device, or a calling line identifying circuit is provided for each switch frame idenpendently of the switch control device. Such a well known system has the disadvantage that, in the former method in which the whole or part of the calling line identifying circuit is incorporated in the switch control device, the calling line identifying circuit is wastefully occupied until the switch operation completed, while in the latter case it is necessary to provide a greater number of calling line identifiers with the increase in the number of switch frames.

Accordingly, it is an object of the present invention to provide an economical line identifying system.

Another object of the invention is to provide a line identifying system with a higher operating efficiency.

Still another object of the invention is to provide a line identifying system in which a small number of calling line identifying circuits can meet the requirement for a great number of switch frames.

According to one aspect of the invention, the calling line identifying circuit is provided independently of the switch control device and commonly to a plurality of switch frames to each of which it is connected through a connector, thus making possible an economical calling line identifying system with a small number of calling line identifiers even in the case of a great number of switch frames.

According to another aspect of the invention, once the calling line identifying circuit connected to a switch frame by the connector has identified the position on the switch frame of the calling line and has transferred the result of identification to the switch control device, the connector is disconnected and renders itself ready to respond to another call. This advantage enables the calling line identifying circuit to be used highly efficiently.

According to still another aspect of the invention, after the connection between the calling line identifying circuit and a switch frame by the connector is released, that switch frame is subjected to the controlling of the switch control device in such a manner that the use of the calling line identifying circuit is prevented until the speech path or the identified calling line is established. In this way, the state of "confusion" in which tha calling line which has already been identified is again subjected to an identifying process is avoided.

The above and other objects, features and advantages will be made apparent by the detailed description taken in conjunction with the accompanying drawings, in which.

Figure 1:
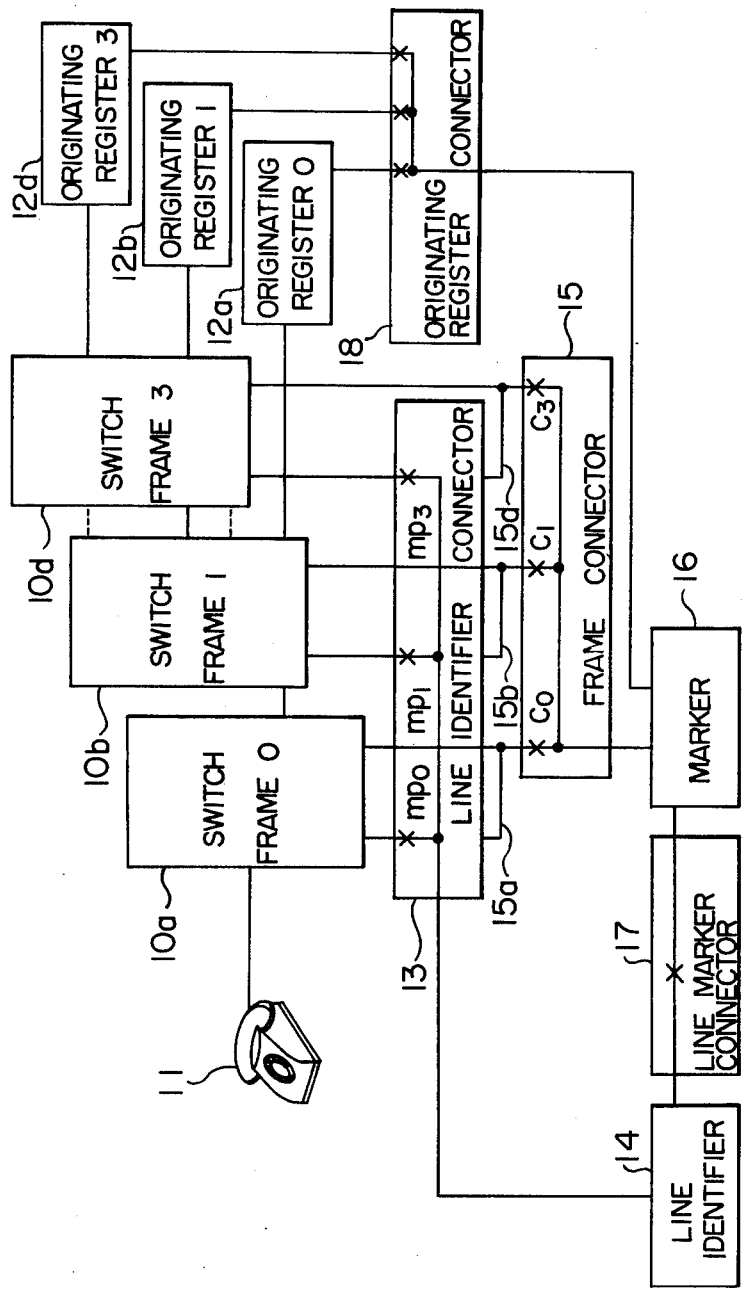
FIG. 1 is a block diagram showing the automatic switching system of common control type embodying the present invention.

Referring to FIG. 1 showing a typical embodiment of the invention, the switching system according to the invention comprises four switch frames 10a to 10d. One side of the switch frames 10a–10d is connected to a typical telephone set 11 and the other side thereof to originating registers 12a to 12d and not-shown various trunks for speech. Each of the switch frames 10 is connected to a line identifier 14 through a line identifier connector 13 and also to a marker 16 or switch control device through a frame connector 15. The line identifier 14 is adapted to be connected to the marker 16 by a line marker connector 17, while the originating register 12 is adapted to be connected to the marker 16 by the originating register connector 18.

In the above-mentioned construction, features of the present invention are such that the line identifier 14 is commonly used for the switch frames 10a to 10d by provision of the line identifier connector 13 and the line identifier connector is adapted to be controlled by the frame connector 15 through the lead wires 15a to 15d. Other devices shown by blocks in FIG. 1 are similar to those of the well known crossbar switching system, and those sections of the system of FIG. 1 which are related to the features of the invention are shown in the circuit diagram of FIG. 2.

Figure 2:
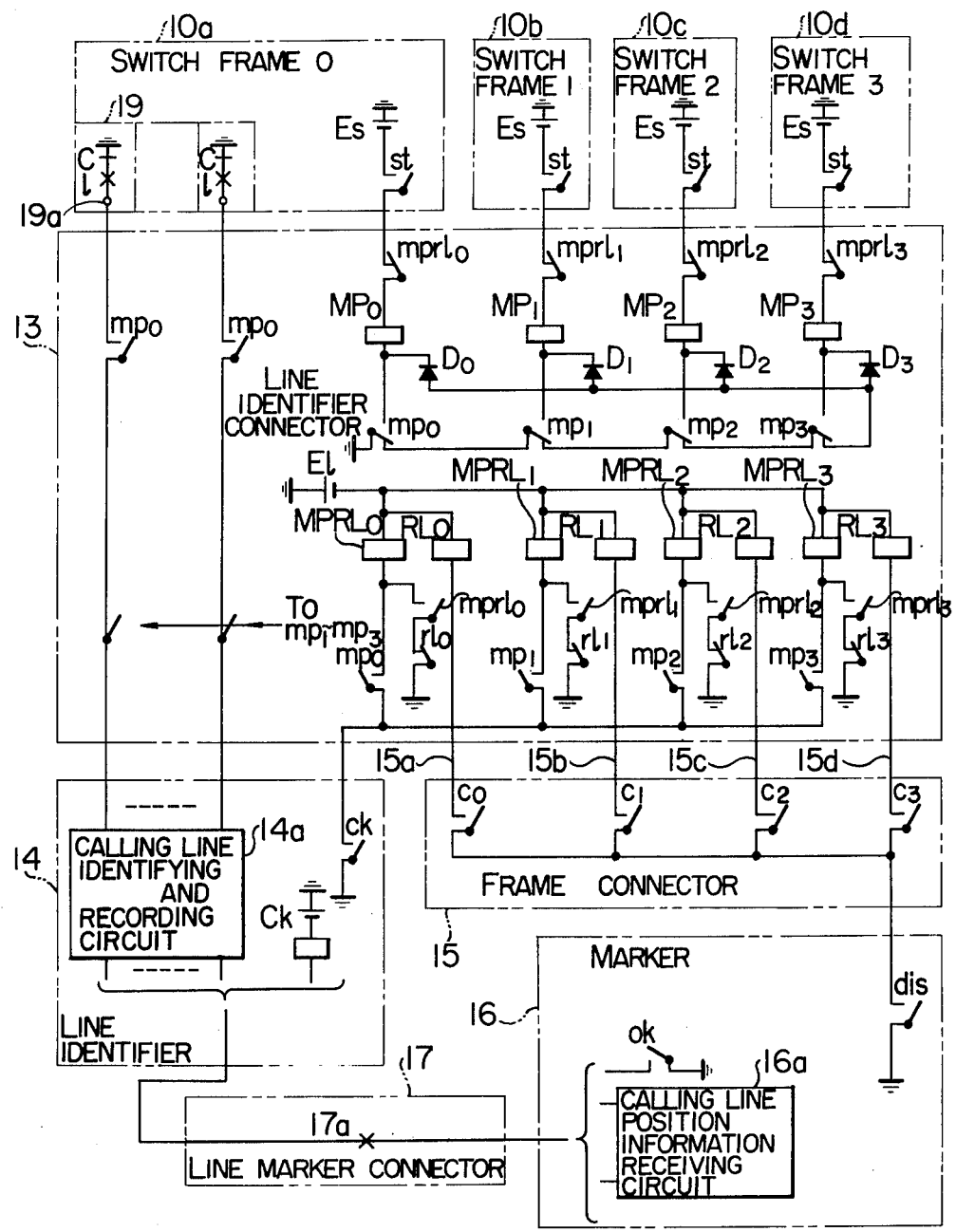
FIG. 2 is a circuit diagram showing those sections of the system of FIG. 1 which are related to the present invention.

In FIG. 2 are shown mainly connector relays MP0 to MP3 of the line identifier connector 13 corresponding to the switch frames 10a to 10d and a preference circuit thereof, connector release relays MPRLO to MPRL3 and a holding circuit thereof, release relays RL0 to Rl3 and an operation circuit thereof.

One end of each of the coils of the connector relays MP0 to MP3 is connected to a battery Es through the contacts Mprl0 to mprl3 of the connector release relay MPRL0 to MPRL3 and starting contacts st in the switch frames 10a to 10d, while the other end thereof is connected to diodes D0 to D3 and the contacts mp0 to mp3 of the connector relays MP0 to MP3. The diodes D0 to D3 and the contacts mp0 to mp3 make up a well known preference holding circuit. release relays MPRL0 to MPRL3 is connected to a battery El, while the other end thereof connected to the through a corresponding one of ground make contacts mp0 to mp3 of the connector relays and the check relay contact ck of the line identifier on one hand and also to ground through a corresponding one of the make contacts mprl0 to mprl3 and a corresponding one of the break contacts rl0 to rl3 of the release relays RL0 to RL3.

One end of the coils of the release relays RL0 to RL3 is connected to the battery El, while the other end thereof is connected through a corresponding one of the leads 15a to 15d, through a corresponding one of the make contacts c0 to c3 of the connector relays of the frame connector 15, through the make contact dis of the release relay of the marker 16, to ground.

The operation of the embodiments shown in FIGS. 1 and 2 will be explained below.

When the subscriber lifts the handset of the telephone 11, a line circuit 19 as shown in FIG. 2 associated with the switch frame corresponding to the subscriber's line 11 is actuated thereby to operate the starting relay ST. The operation of the starting relay ST causes the connector relay MP0 corresponding to the switch frame 10a to be energized through the battery Es and starting relay contact st in the switch frame 10a and through the break contact mprl0, connector relay MP0, diode D0, break contact mp3, break contact mp2, break contact mp 1 and break contact mp 0, the line identifier connector 13 and to ground. Connector relay MP0 is locked up by its contact mp0, while at the same time cutting off the operating earth for the other connector relays MP1 to MP3. When the connector relay MP0 is thus energized and held, the calling line identifying terminals 19a of all the line circuits 19 of the switch frame 10a are connected through the make contacts mp0 to the well known calling line identifying and recording circuit 14a in the line identifier 14 thereby to selectively identify a line in the calling status in the switch frame 10a. Upon completion of the identification of the calling line, the line identifier 14 causes the line marker connector 17 to be energized through a circuit not shown thereby to connect itself to the marker 16. When the connector contact 17a of the line marker connector 17 is closed, information on the position of the calling line which is stored in the calling line identifying and recording circuit 14a is transferred to the calling line position information receiving circuit 16a of the marker 16. After making sure that such imformation has been received without fail, the marker 16 closes the contact ok, whereupon the check relay CK of the line identifier 14 is energized and the contact cK, thereof is closed, with the result that the relay MPRL0 is energized through ground, contact ck, contact mp0 in the line identifier connector 13, connector release relay MPRL0 and the battery El. The relay MPRL0 is locked up by the make contact mprl0 thereof and the break contact rl0 of the relay R L O, while at the same time disconnecting battery Es from the connector relay MP0 by the break contact mprl0 thereby to release the relay MP0. The resulting release of the transfer contact mp0 prepares an operation circuit for the other connector relays MP1 to MP3. Therefore, if there is a calling line in the switch frames 10b to 10d and the contact st is closed, one of the switch frames 10b to 10d causes a corresponding one of the connector relays MP1 to MP3 to operate in predetermined order of preference, whereupon connection with the line identifier 14 is established thereby to provide services for identification of a calling line. However, even if there is a calling line in the switch frame 10a and the contact st is closed, the fact that the operation of the relay MPRL0 is held as mentioned above maintains the operation circuit for the connector relay MP0 opened at the contact mprl0, thus preventing the relay MP0 from being energized.

As is well known, upon receipt of calling line position information, the marker 16 energizes the originating register connector 18 and selects a free originating register 12. After that, the frame connector 15 is energized and the connector contact co corresponding to the switch frame 10a is closed, so that a desired switch frame 10a is energized thereby to establish a path between subscriber 11 and originating register 12a.

When the path from the subscriber 11 to the originating register 12a is completed, the make contact dis of the marker 16 shown in FIG. 2 is opened thereby to energize the release relay RL0 of the line identifier 13 through ground, the make contact dis, the connector contact co, the lead 15a, the release relay RL0, and battery El. Upon energization of the relay RL0, the holding circuit of the relay MPRL0 that has been locked at the break contact rl0 is opened, so that relay MPRL0 is released and an operation circuit for the connector relay MP0 is prepared by the break contact mprl0, with the result that calling line identification services are again ready for the switch frame 10a. Thus, receipt of two or more identification services by the the same subscriber 11 is prevented by ignoring the request of calling line identification from the switch frame 10a until the connection is complete between the identified subscriber 11 and the originating register 12a.

Figure 3:
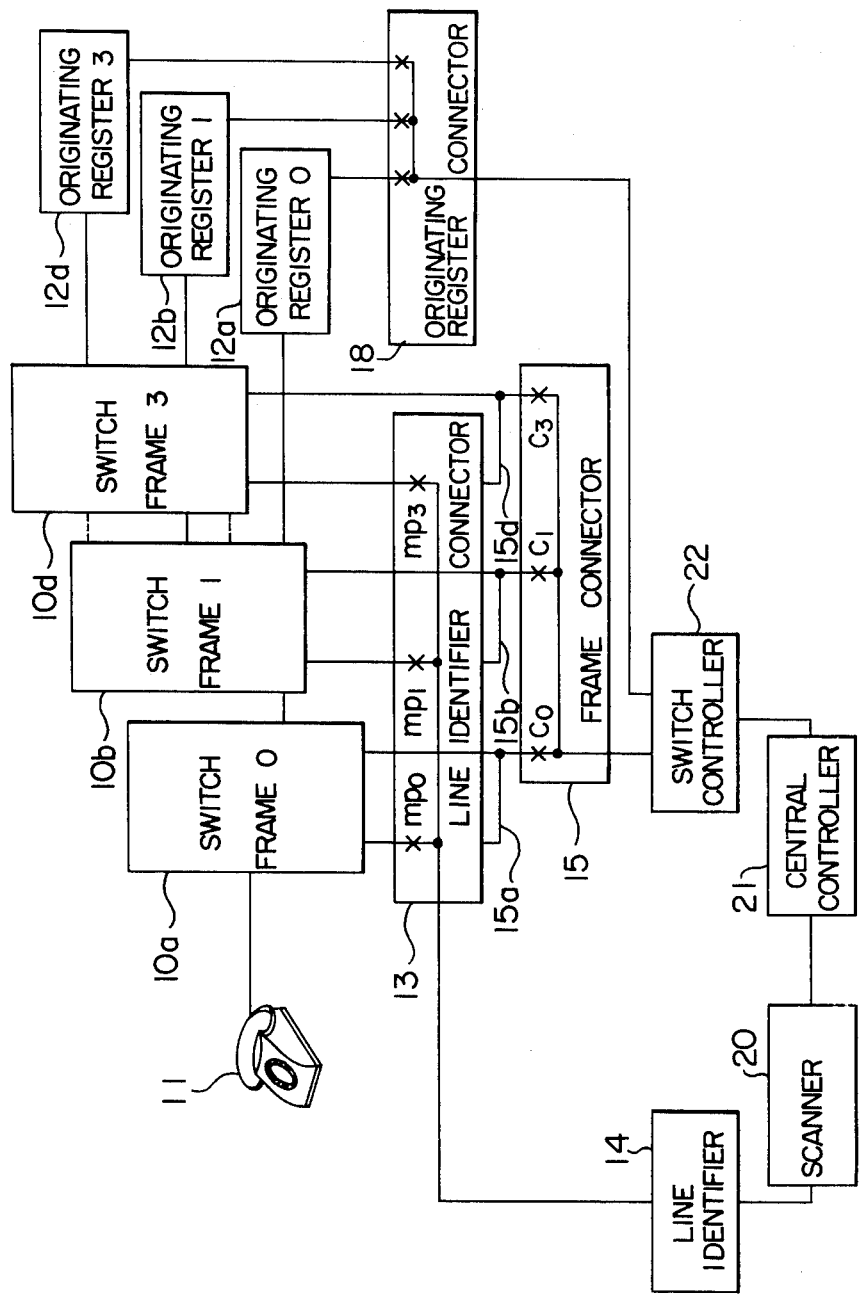
FIG. 3 is a block diagram showing an automatic switching system of common control type according to another embodiment of the invention.

Referring to FIG. 3 showing a circuit arrangement of the calling line identification system according to the invention as it is applied to the electronic switching system, a well known scanner 20, central controller 21 and a switch controller 22 are connected in series with the line identifier 14, the remaining sections of the arrangement being the same as those shown in FIG. 1.

In this arrangement, line information from the line identifier is sent to the central controller 21 through the scanner 20 as shown, and further to the switch controller 22 through the central controller 21.

It is based on the same principle as that mentioned with reference to FIGS. 1 and 2 that the connector 13 and the line identifier 14 are released after the reading by the scanner 20, that the calling line identification operation of the switch frame 10a is prevented until the end of operation of the switch controller 22, and that upon the releasing of the connector 13, a call from the other switch frames 10b to 10d can be processed immediately.

What is claimed is:

1. In an automatic telephone exchange of the common control type, including
   a plurality of switch frames each of which is connectible with a plurality of subscriber's line circuits;
   a line identifier, controllably connectible to each of said switch frames, for identifying the respective line circuits which are connected with said switch frames; and
   a common control, coupled to said line identifier and any one of said switch frames, for controlling the completion of a path from a subscriber's line circuit through said any one of said switch frames in accordance with information representative of the position of a subscriber's line circuit on said any one switch frame received from said line identifier;
   the improvement wherein said system further includes
   a line identifier connector, coupled to each of said switch frames, said line identifier, and said common control, for selectively controlling the connection of individual ones of said switch frames to said line identifier, said line identifier connector comprising, in combination:
   a first plurality of means, each corresponding to one of said switch frames, responsive to a request for service from a subscriber's line circuit, for establishing a connection between a line circuit which is associated with a corresponding switch frame, with which the subscriber's line circuit requesting service is connected, and said line identifier, whereby said line identifier identifies the calling line requesting service, and a second plurality of means, each corresponding to a respective one of said first means, responsive to the receipt of calling line identification information by said common control from said line identifier, for preventing said corresponding one of said first plurality of means from establishing a connection between the subscriber's line circuit associated with said corresponding switch frame and said line identifier until said common control has completed said path from said requesting subscriber's line circuit through said corresponding switch frame.

2. The improvement according to claim 1, wherein each one of said first plurality of means comprises a first relay circuit for connecting said subscriber's line circuits in their corresponding switch frame to said line identifier in response to said request for service.

3. The improvement according to claim 2, wherein each one of said second plurality of means comprises a second relay circuit for disabling its corresponding first relay circuit until said common control has completed said connection path through said corresponding switch frame.

4. The improvement according to claim 3, wherein each one of said second plurality of means further comprises a third relay circuit for disabling a corresponding second relay circuit upon the completion of said connection path by said common control, whereby the disabling action of said corresponding second relay circuit on said corresponding first relay circuit is removed, to permit said corresponding first relay circuit to again selectively connect a service-requesting subscriber's line circuit to said line identifier.

5. The improvement according to claim 1, wherein said exchange further includes connector means for connecting said line identifier with said common control.

6. The improvement according to claim 5, wherein said connector means is a scanner and said common control comprises a central controller.

7. The improvement according to claim 1, wherein each one of said first means includes means for selectively establishing a connection between said line identifier and a subscriber's line circuit requesting service, in accordance with a prescribed order of preference assigned to each switch frame.

8. The improvement according to claim 4, wherein each one of said first means includes means for selectively establishing a connection between said line identifier and a subscriber's line circuit requesting service, in accordance with a prescribed order of preference assigned to each switch frame.

* * * * *